United States Patent
Angel et al.

(10) Patent No.: US 10,875,368 B1
(45) Date of Patent: Dec. 29, 2020

(54) WEIGHT DISTRIBUTING ANTI-SWAY TRAILER HITCH

(71) Applicants: Bruce Andrew Angel, Stokesdale, NC (US); Steven L. Spencer, Lawsonville, NC (US)

(72) Inventors: Bruce Andrew Angel, Stokesdale, NC (US); Steven L. Spencer, Lawsonville, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 254 days.

(21) Appl. No.: 16/128,695

(22) Filed: Sep. 12, 2018

(51) Int. Cl.
  *B60D 1/24* (2006.01)
  *B60D 1/32* (2006.01)
  *B60D 1/34* (2006.01)

(52) U.S. Cl.
  CPC ............. *B60D 1/247* (2013.01); *B60D 1/325* (2013.01); *B60D 1/345* (2013.01)

(58) Field of Classification Search
  CPC ........ B60D 1/247; B60D 1/325; B60D 1/345; B60D 1/34
  USPC ..................................................... 280/455.1
  See application file for complete search history.

(56) References Cited

U.S. PATENT DOCUMENTS

| | | | | |
|---|---|---|---|---|
| 3,741,587 A | * | 6/1973 | Wilaman | B62D 53/0871 280/406.2 |
| 3,801,133 A | * | 4/1974 | Thompson | B60D 1/065 280/406.2 |
| 4,213,627 A | * | 7/1980 | Thompson | B60D 1/065 280/406.2 |
| 5,375,867 A | | 12/1994 | Kass et al. | |
| 5,465,991 A | | 11/1995 | Kass et al. | |
| 6,860,501 B2 | | 3/2005 | Schmidt et al. | |
| 8,641,075 B1 | | 2/2014 | Angel | |
| 8,985,611 B1 | | 3/2015 | Angel et al. | |
| 9,132,708 B1 | | 9/2015 | Angel et al. | |
| 2018/0126810 A1 | * | 5/2018 | Anderson | B60D 1/06 |

* cited by examiner

*Primary Examiner* — Ruth Ilan
*Assistant Examiner* — Felicia L. Brittman
(74) *Attorney, Agent, or Firm* — Tuggle Duggins P.A.; Blake P. Hunt (57) ABSTRACT

A weight distributing anti-sway trailer hitch has a pair of spring arms extending rearwardly from the head unit and a pair of hookup brackets for connecting a remote end of each spring arm to a trailer. The hookup brackets have a hookup plate and a hookup strap that sandwich a trailer frame therebetween to secure the bracket to the trailer, and further have a clamp that can be opened and closed to secure the remote end of the spring arm to the trailer frame during towing.

16 Claims, 9 Drawing Sheets

FIG. 9

WEIGHT DISTRIBUTING ANTI-SWAY TRAILER HITCH

FIELD OF THE INVENTION

The invention herein pertains to trailer hitches in general and more particularly pertains to a trailer hitch that redistributes weight among the axles of the trailer and tow vehicle and reduces side-to-side sway of the trailer while being towed.

DESCRIPTION OF THE PRIOR ART AND OBJECTIVES OF THE INVENTION

A conventional manner of connecting a trailer to a vehicle used to tow the trailer involves attaching a socket located at the front of the trailer to a ball attached to a shank, which is in turn attached to the tow vehicle. A clamp is used to secure the connection between the ball and socket which prevents vertical separation of the ball and socket, but still allows rotational movement (in a horizontal plane) of the socket, and trailer, relative to the ball. While the rotational movement is necessary to allow the trailer to turn relative to the tow vehicle, it also allows the trailer to sway from side to side, relative to the direction of travel of the tow vehicle. This can create a dangerous situation, particularly with heavier trailer loads, as the swaying motion of the trailer can cause the driver of the tow vehicle to lose control. External factors such as wind, uneven road surfaces and actions of other drivers can exacerbate this already serious situation.

Attempts have been made in the past to control trailer sway (also known as "fishtailing"). One approach has been to stiffen the pivot joint between the trailer and tow vehicle, an approach referred to as "locking" the trailer to the tow vehicle. While this approach can reduce sway, it also by necessity reduces the maneuverability of the trailer, making it difficult to back the trailer or make tight turns with the tow vehicle. In addition, with heavy loads, the trailer will tend to want to continue in a straight line when the tow vehicle is in a turn, and can result in the trailer literally pushing the rear of the tow vehicle off the road. Further, this approach of locking the trailer to the tow vehicle places additional stresses on the trailer components, particularly in turns, which can result in structural failures of the trailer components.

Another technique for reducing sway is to use what is known as a weight distribution hitch. The function of the hitch is to re-distribute the weight of the trailer, trailer cargo, the tow vehicle and any cargo in the rear of the tow vehicle. This type of hitch has a shank that fits into the receiver at the rear of the tow vehicle. A head unit is attached to the shank and supports the ball, to which the trailer socket is attached. A pair of spring arms are attached to the head unit and extend rearwardly, away from the tow vehicle and toward the trailer axle(s) and are connected to the trailer frame at a location remote from the ball and socket connection, typically by use of a bracket or short lengths of chain. The weight from the trailer and cargo carried by the trailer pushes down on the ball and the head unit. This downward force creates a downward force at the remote end of the spring arms. The bracket or chains hold the bars against this downward force and the tension within the spring arms is transferred back to the head unit as an upward force. The result is a more level, even profile for both the tow vehicle and the trailer and better handling of the tow vehicle because the weight has been redistributed from the ball and socket connection to the axles.

Examples of prior art weight distribution hitches include U.S. Pat. Nos. 9,132,708; 8,641,075; 8,985,611; 6,860,501; 5,465,991; and 5,375,867, the disclosures of which are incorporated herein by reference in their respective entireties. While these prior art devices worked well, they were often difficult or cumbersome to apply, required considerable effort by the user, or required precise matching of the hitch to the particular trailer or load and could not readily be employed across different trailer manufactures. In addition, while weight distribution hitches can help alleviate the sway on lighter loads, it is often necessary to use a supplemental anti-sway device for heavier towing operations.

In view of the problems and disadvantages associated with prior art devices, the present invention was conceived and one of its objectives is to provide a weight distribution hitch with anti-sway feature having greater versatility and use with a wide variety of trailers.

It is still another objective of the present invention to provide a weight distribution hitch having a clamp and friction pads to engage a spindle post as a way of controlling rotation of the trunnion components to prevent sway.

It is yet another objective of the present invention to provide a weight distribution hitch having spring arms retained within respective trunnion spools, one of which is fixed against rotation relative to a trunnion plate.

It is another object of the invention to provide a weight distribution hitch having adjustable brackets for attachment of the spring arms to a trailer.

Various other objectives and advantages of the present invention will become apparent to those skilled in the art as a more detailed description is set forth below.

SUMMARY OF THE INVENTION

The aforesaid and other objectives are realized by providing a weight distributing anti-sway trailer hitch having a shank adapted to be inserted into a receiver on a tow vehicle, a head unit connected to the shank, a pair of spring arms extending rearwardly from the head unit and a pair of brackets for connecting a remote end of each spring arm to a trailer. The head unit includes a U-ear hitch plate connected to the shank, the U-ear hitch plate including a top plate and a bottom plate extending rearwardly therefrom and a threaded boss firmly affixed to a back side of the U-ear hitch plate. The top and bottom plates are in spaced apart relationship to one another and sandwiched therebetween are an upper trunnion plate, a lower trunnion plate, a spindle post, a spindle spool, a clamp, and a pair of friction pads. The spindle spool is concentrically disposed within the spindle post, which sits between the upper and lower trunnion plates. A hitch ball shaft, having a hitch ball mounted thereto, is disposed through the top plate, the bottom plate, the spindle spool and the upper and lower trunnion plates, such that the upper and lower trunnion plates can pivot relative to the U-ear hitch plate. The friction plates are affixed to an inside surface of the clamp which is attached to the U-ear hitch plate via the threaded boss. The friction plates engage the spindle spool and the amount of friction between the friction plates and the spindle spool can be adjusted by tightening or loosening the clamp. The trunnion plates have a wing-shaped configuration when viewed in plan, with the central portion forming a pivot point with the ball hitch shaft/spindle spool/spindle post structure. The exterior ends of the wing structure form a connection point between the head unit and the spring arms. Located between the upper and lower trunnion plates is a pair of trunnion spools, each trunnion spool being adapted to receive one end of a spring arm. Each trunnion spool is affixed to a pair of saddles located above and below the trunnion spool and a spindle disposed within an aperture in the saddles and the trunnion spool.

DETAILED DESCRIPTION OF THE PREFERRED EMBODIMENT AND OPERATION OF THE INVENTION

Figure 1:
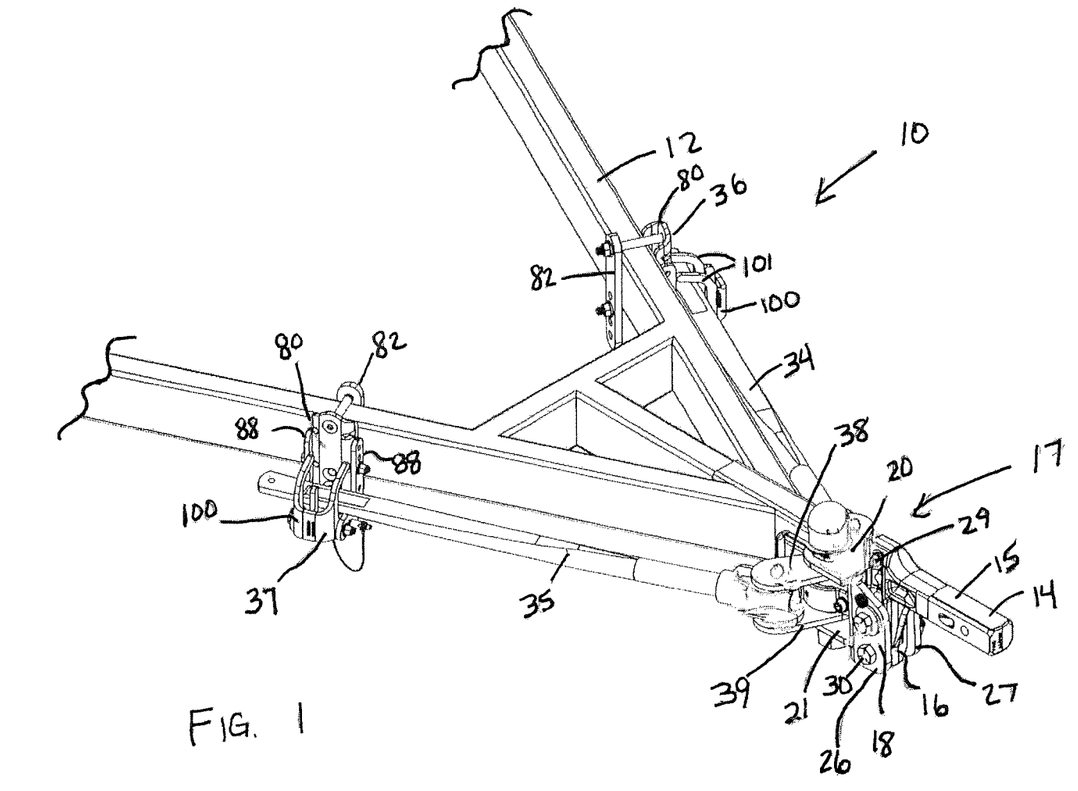
FIG. 1 is a perspective view, partly fragmented, of a weight distributing anti-sway trailer hitch of the invention, illustrated with a trailer attached.
Figure 2:
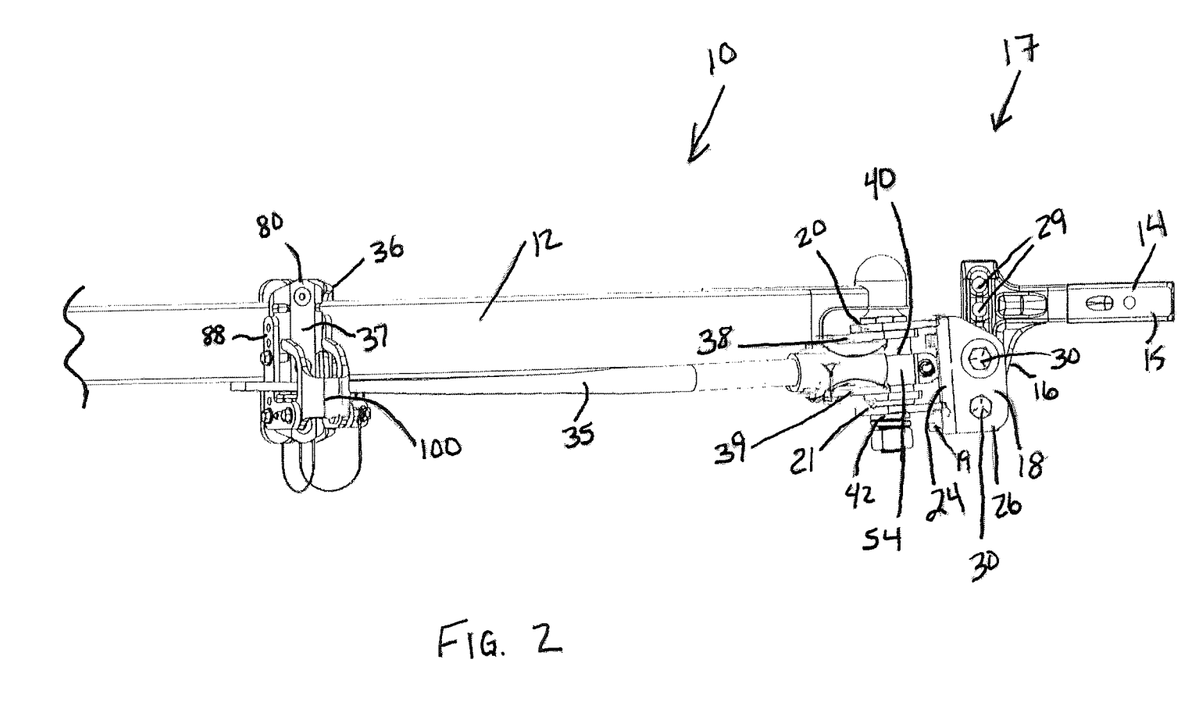
FIG. 2 is a side elevational view, partly fragmented, of the embodiment of the hitch and attached trailer of FIG. 1.
Figure 3:
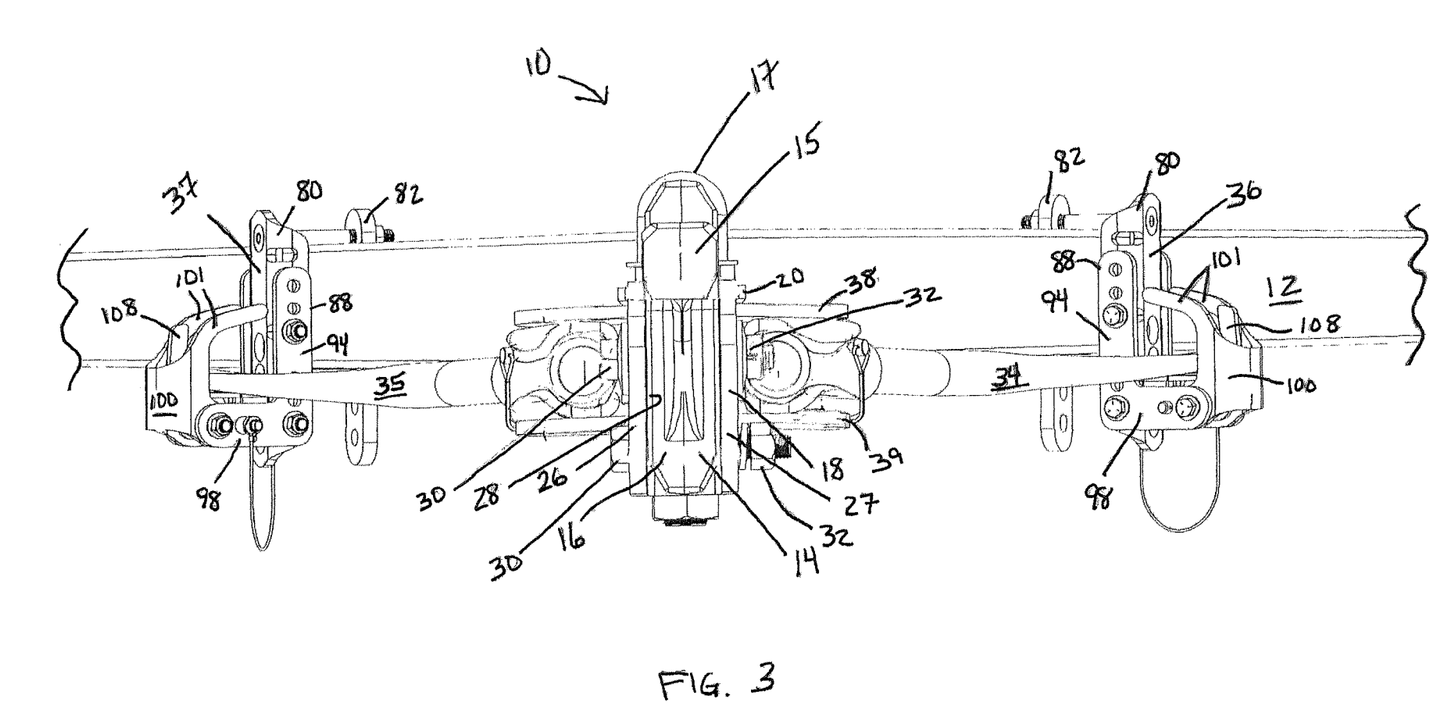
FIG. 3 is an enlarged front view of the embodiment of the hitch and attached trailer of FIG. 1.
Figure 4:
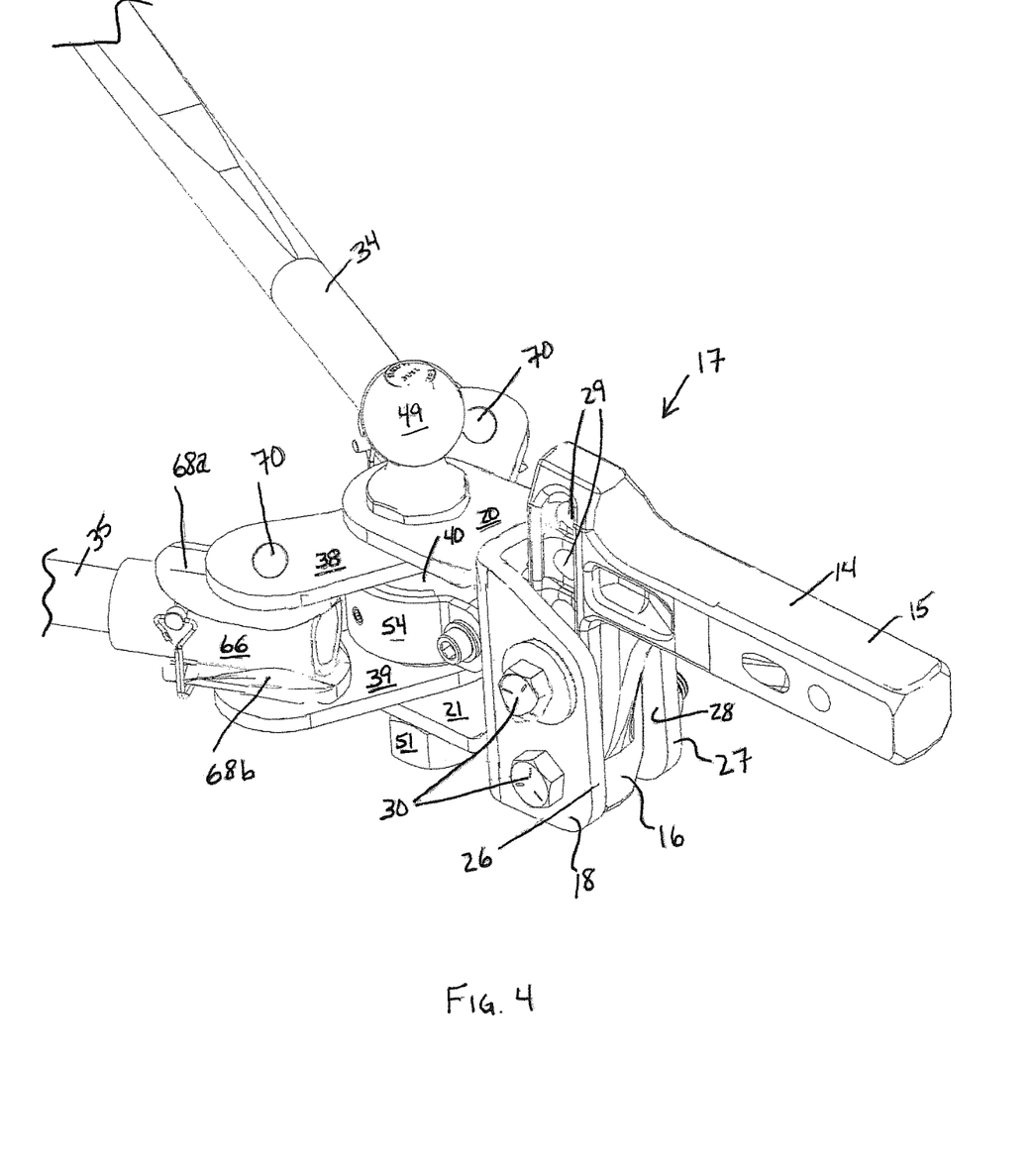
FIG. 4 is an enlarged perspective view, partly fragmented, of an embodiment of the head unit of the weight distributing hitch of the invention with the trailer removed.

For a better understanding of the invention and its operation, FIGS. 1-3 illustrate the preferred embodiment of the weight distribution hitch of the invention, designated generally at 10, illustrated attached to a trailer 12 to provide environmental context on the use of the invention. It is understood that the trailer itself is not considered a necessary or essential element of the invention. As seen in these Figures, the hitch 10 has a shank 14 which may be conventional and is designed to attach the weight distributing hitch 10 to a tow vehicle, such as a car or truck (not shown). More specifically, the shank 14 has a horizontal leg 15 and a vertical leg 16, disposed at generally a right angle to one another. Horizontal leg 16 is of a size and shape that would be understood to fit within a hitch receiver (not shown), which in turn is attached to the tow vehicle (not shown).

The shank 14, and in particular leg 16 of shank 14, is attached to a head unit 17 of the weight distributing hitch 10. The head unit 17, which will be described in greater detail herein, has a U-ear hitch plate 18 having spaced-apart first and second (i.e. top and bottom) plates 20, 21, respectively, that extend horizontally from a rear face 24 of the U-ear hitch plate 18. The U-ear hitch plate 18 has two forward facing, spaced-apart flanges 26, 27 that define a channel 28 for attaching the vertical leg 16 of shank 14 to the U-ear hitch plate 18. The opening of channel 28, as seen in the Figures, is oriented opposite from rear face 24 of the U-ear hitch plate 18. In order to accommodate various size trailers and vehicles, the vertical leg 16 of shank 14 is preferably provided with a plurality of spaced-apart apertures 29 (FIG. 9) to provide an ability to adjust the shank 14 vertically relative to the U-ear hitch plate 18. The shank 14 may be attached to the U-ear hitch plate 18 by any conventional fasteners that are sufficiently robust to handle the stresses placed on the connection, such as bolts 30 and nuts 32. Adjustment screw 19 (FIG. 8-9) and thumb knob 22 (FIGS. 6, 8-9) are provided to maintain the proper spacing between shank 14 and u-ear hitch plate 18.

Attached to the head unit 17 is a pair of spring arms 34, 35 which extend rearwardly from the head unit 17 toward the rear of trailer 12. The end of spring arms 34, 35 distal from head unit 17 are held in place against the trailer by respective hookup brackets 36, 37. The hookup brackets 36, 37 will be described in further detail below in connection with FIG. 7.

Figure 5:
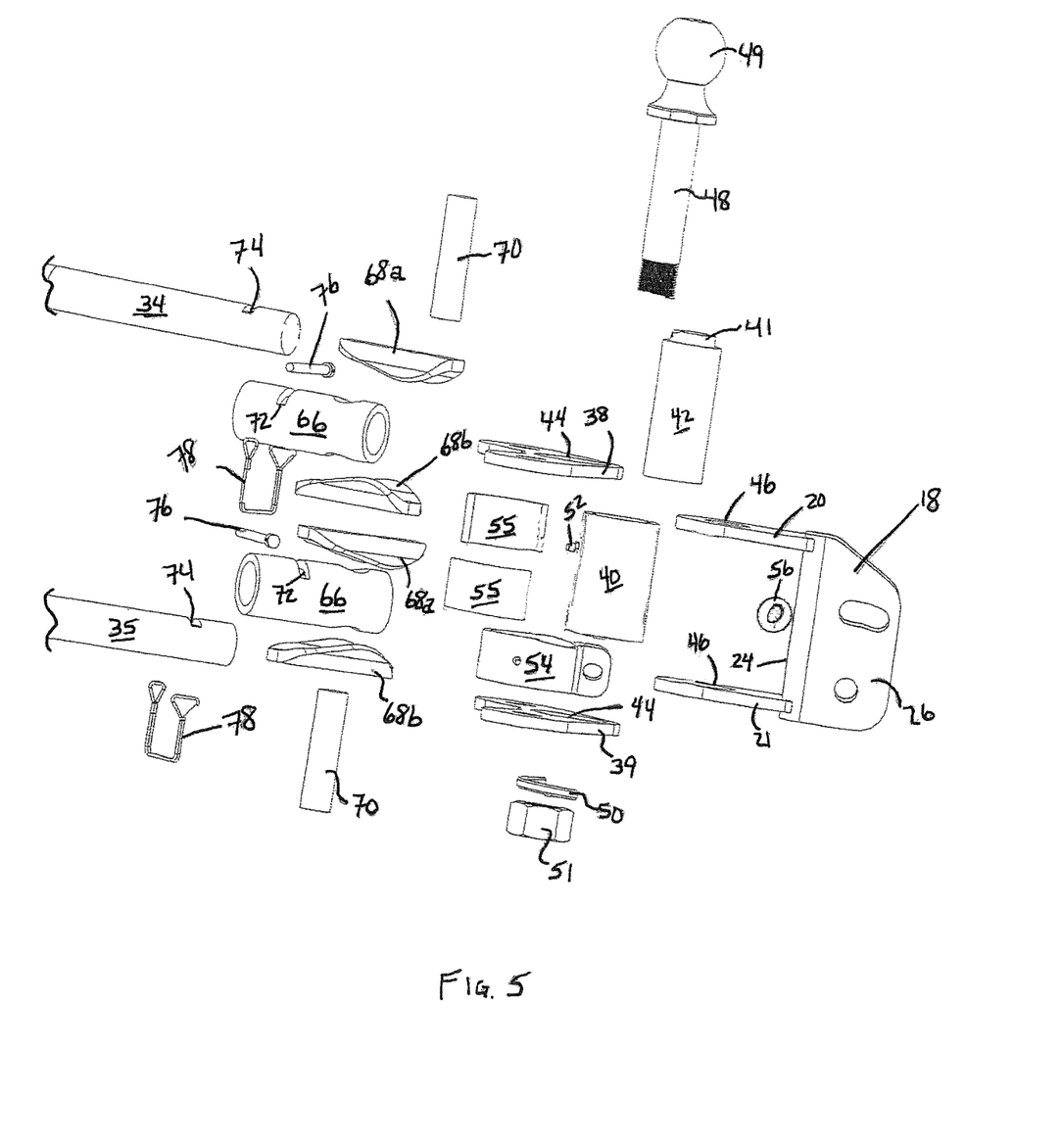
FIG. 5 is an exploded perspective view, partly fragmented, of an embodiment of the head unit of the weight distributing hitch of the present invention.
Figure 6:
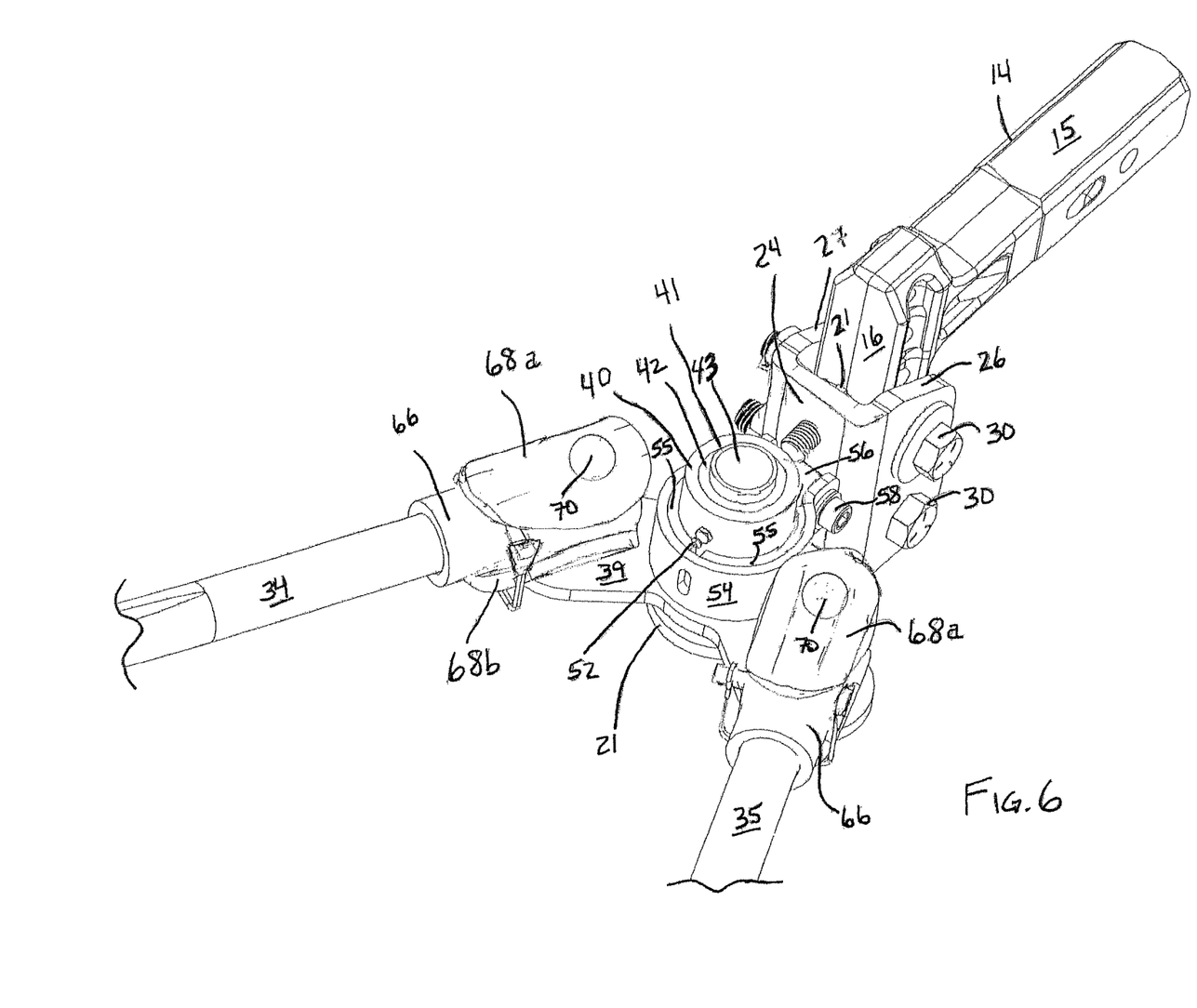
FIG. 6 is a top perspective view, of an embodiment of the head unit of the weight distributing hitch of the present invention.
Figure 8:
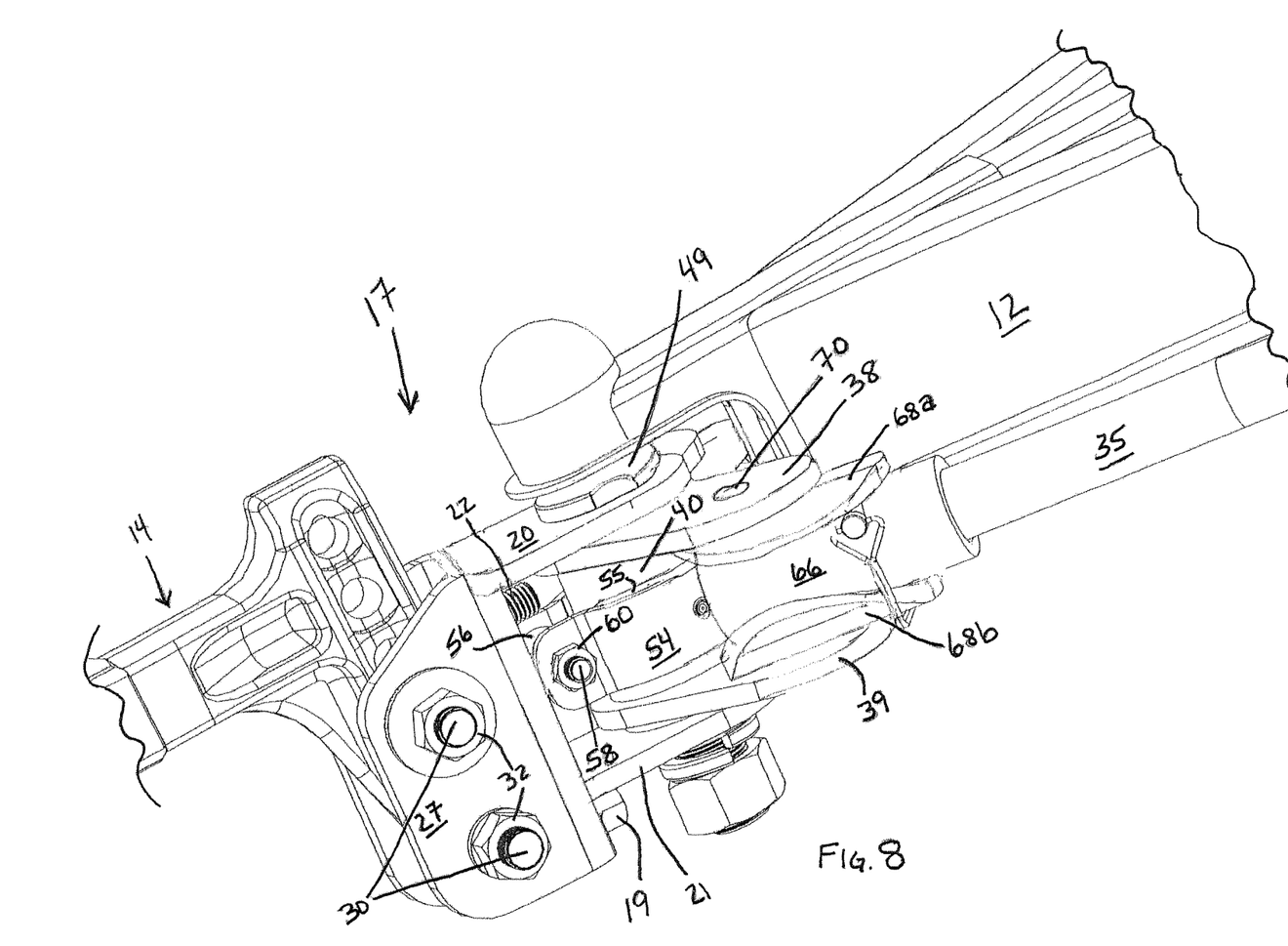
FIG. 8 is an enlarged, left side perspective view, partly fragmented, of an embodiment of the head unit of the weight distributing hitch of the invention.
Figure 9:
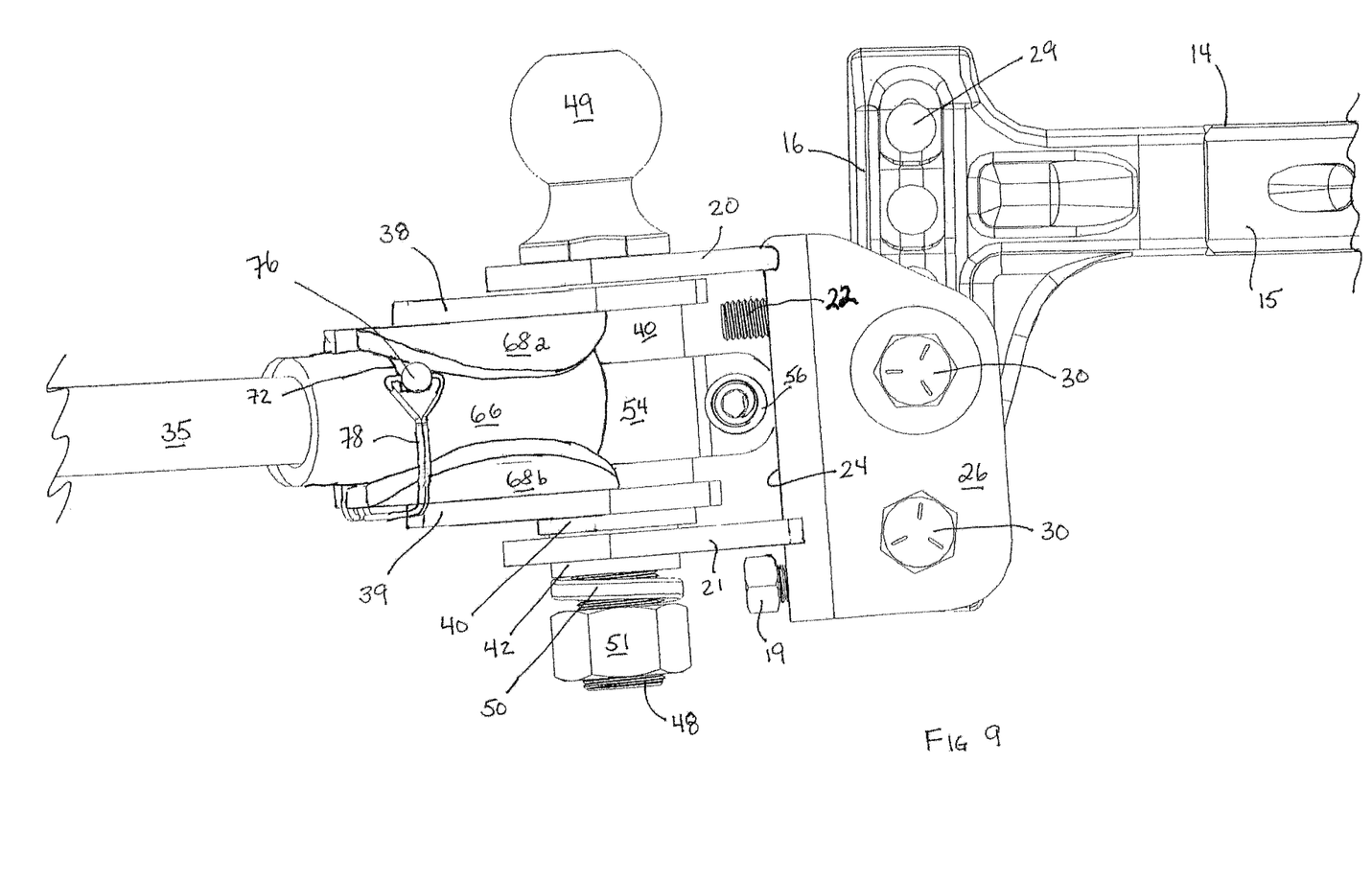
FIG. 9 is an enlarged, right side perspective view, partly fragmented, of an embodiment of the head unit of the weight distributing hitch of the invention with the trailer body removed.

With particular reference now being made to FIGS. 4-6, 8, and 9, FIGS. 6, 8, and 9 are enlarged perspective views, partly fragmented, of the head unit 17. FIG. 6 shows the unit from the upper right perspective, and the hitch ball 49, hitch ball shaft 48, upper trunnion plate 38, and top plate 20 are not shown in FIG. 6 for clarity of illustration and discussion. FIG. 8 shows the unit from the left side perspective with the trailer 12 attached, and FIG. 9 shows the unit from the right side elevation with the trailer 12 hidden. The head unit 17 includes a pair of trunnion plates 38, 39, which preferably defined a wing-shaped configuration when viewed in plan as best seen in FIGS. 1, 3, 5 and 6. The trunnion plates 38, 39 are positioned adjacent to and in between the top and bottom plates 20, 21, respectively, of the U-ear hitch plate 18. The trunnion plates 38, 39 are mounted on a spindle post 40 and spindle spool 42 (FIG. 5). Both spindle post 40 and spindle spool 42 comprise cylindrical members with a central opening. Spindle spool 42 is disposed within spindle post 40 as seen in FIG. 6, for example, to form a concentric cylinder-in-cylinder sub-assembly with a central opening 43 (FIG. 6). As seen in FIG. 5, each trunnion plate 38, 39 has an aperture 44 that is aligned with an aperture 46 in each of the top and bottom plates 20, 21, forming a through-hole opening to receive the hitch ball shaft 48 therein. Spindle spool 42 having a cylindrical flange 41 extending therefrom (see FIGS. 5 and 6) of smaller outer diameter than the remainder of spindle spool 42. This reduced diameter flange 41 forms a shoulder area which helps support the upper trunnion plate 38.

The hitch ball shaft 48 is shown with a hitch ball 49 affixed thereto, as may be conventional. Fasteners such as lock washer 50 and nut 51 secure the hitch ball shaft 48 in position. A grease fitting or zerk 52 (FIG. 6) located on the spindle post 40 passes through both spindle post 40 and spindle spool 42 and permits lubrication of central opening 43 and the interface between the hitch ball shaft 48 and spindle spool 42 to reduce the frictional interactions therebetween as the spindle spool 42, spindle post 40 and trunnion plates 38, 39 rotate about the hitch ball shaft 48. A clamp 54 having one or more, and preferably a pair of opposing friction pads 55 affixed to an inside surface of the clamp is disposed about spindle post 40. The clamp is secured to boss 56, which is preferably threaded and welded or otherwise fixedly attached to the rear surface 24 of U-ear hitch plate 18, and receives a suitable fastener, such as bolt 58 and nut 60. The friction pads 55 engage the spindle post 40 and the amount of frictional engagement between the friction pads 55 and the spindle post 40 may be adjusted within a finite range by tightening or loosening the clamp 54 by bolt 58 and nut 60.

The spring arms 34, 35 are preferably respectively connected by their first ends to the upper and lower trunnion plates 38, 39 by trunnion spools 66, saddles 68 and spindles 70. The saddles 68, comprising an upper saddle 68a and lower saddle 68b, are plates with a convex shape to mate with the outer circumferential surface of the trunnion spools 66. The upper saddle 68a is positioned above and the lower saddle 68b is positioned below the trunnion spool 66. The upper and lower saddles 68a, 68b are securely attached to the trunnion spools 66, such as by welding. Spindle 70 is positioned vertically to connect upper trunnion plate 38 and lower trunion plate 39 and passes through apertures in the upper saddles 68a, trunnion spools 66, and lower saddles 68b, whereby the trunnion spools and the attached saddles can pivot relative to the trunnion plates. However, in use, only one of the trunnion spools will rotate relative to the trunnion plates 38, 39 while the other trunnion spool is fixed in position relative to the trunnion plates 38, 39 so as to prevent any rotational movement of that trunnion spool.

Trunnion spools 66, as seen in FIG. 5, further preferably define a transverse notch 72 which aligns with a transverse notch 74 in each of the spring arms 34, 35 when the first ends of the spring arms are inserted into the trunnion spools. A pin 76 and spring bail 78 secure the spring arms within the trunnion spools. The opposite or second ends of the spring arms 34, 35, remote or distal from the trunnion spools 66, is secured to the trailer by hookup brackets 36, 37, which will be described with particular reference to FIG. 7 below.

Figure 7:
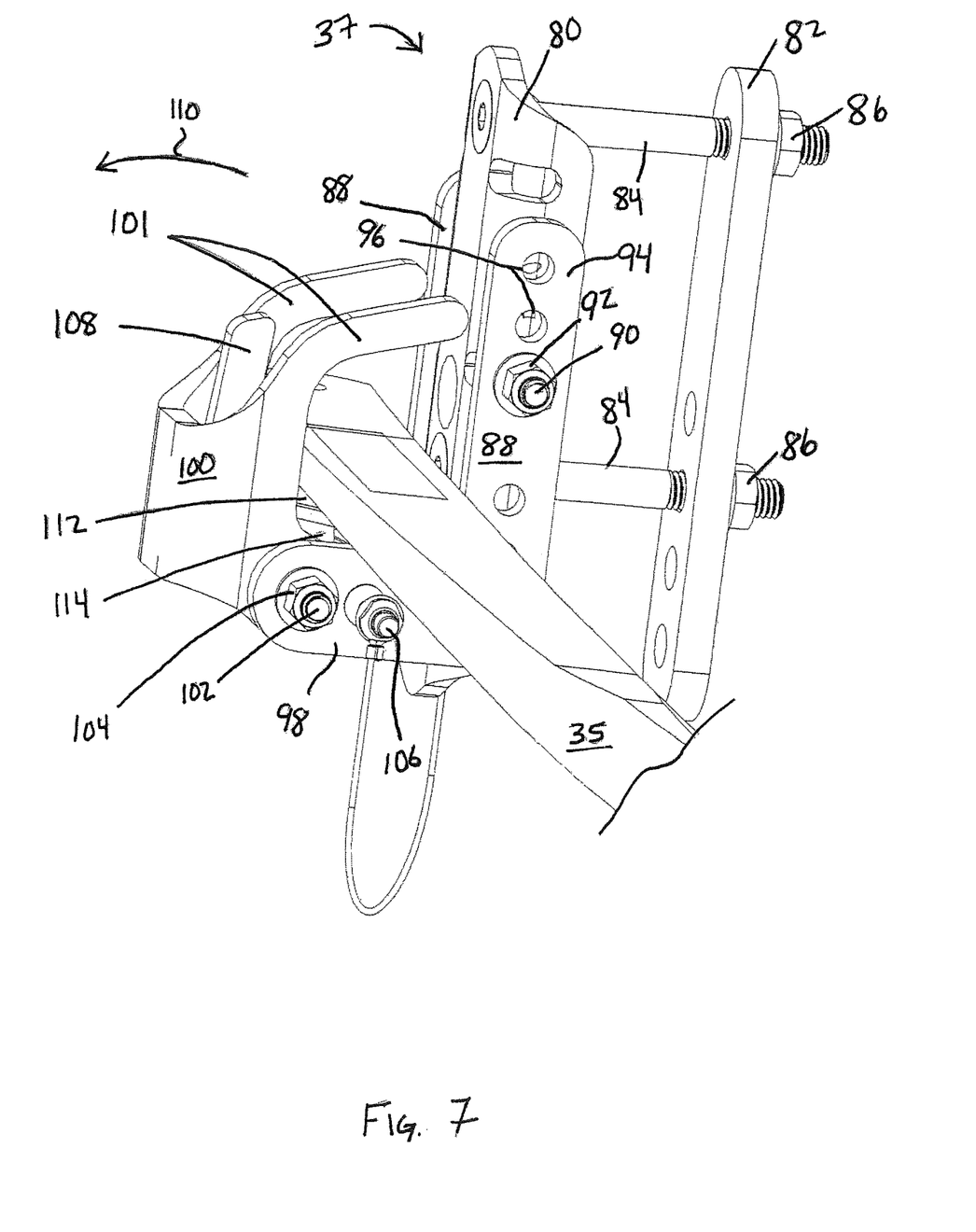
FIG. 7 is an enlarged perspective view of an embodiment of the hookup bracket assembly of the weight distribution hitch of the invention.

FIG. 7 shows an enlarged perspective view of hookup bracket 37, which would be located on the right side of the trailer, which may correspond to the passenger side of the tow vehicle in the United States. It is understood that the left side hookup bracket 36 (FIGS. 1-3) is a mirror image of hookup bracket 37. The trailer frame 12 is not shown in FIG. 7 for clarity of illustration. Hookup bracket 37 has a hookup plate 80 that would be positioned on the outside of the trailer frame (not shown) and a hookup strap 82 that would be positioned on the inside of the trailer frame (not shown). A pair of bolts 84 and nuts 86 secure the hookup plate 80 and hookup strap 82 to the trailer frame (not shown). A pair of L-shaped side straps 88 is attached to the front and rear of the hookup plate 80 by suitable fasteners, such as bolt 90 and nut 92. The vertical portion 94 of the L-shaped side strap 88 is provide with a plurality of apertures 96 to allow for vertical adjustment of the L-shaped side straps 88 relative to hookup plate 80.

The horizontal portion 98 of L-shaped side straps 88 is attached to lift bracket 100 by bolt 102 and nut 104 such that bolt 102 forms a pivot point for lift bracket 100 relative to the horizontal portion 98 of L-shaped side strap 88. The lift bracket 100 has a pair of spaced-apart fingers 101 that may curve inward toward the hookup plate 80. In FIG. 7, the lift bracket 100 is shown in a closed position, whereby spring arm 35 is retained within the space defined by the curved fingers 101 and the horizontal portion 98 of the L-shaped side straps 88. In the open position (not shown) the curved fingers 101 would be pivoted about bolt 102 to the left as indicated by arrow 110, whereby the curved fingers would be spaced from the hookup plate 80 to create an opening therebetween. Spring arm 35 rests on a wear pad 112 which s supported by a spring perch 114. Spring perch 114 is secured to the horizontal portion 98 of L-shaped side straps 88 by bolt 102 and nut 104. A post 108 is rigidly attached to lift bracket 100 near an outer edge thereof. A suitable lever, such as a length of pipe (not shown), may be placed over the post 108 to apply the force necessary to pivot the lift bracket 100 about bolt 102 to move the lift bracket 100 between the open and closed positions. A retainer pin 106 passes through the horizontal portion 98 of L-shaped side strap 88 to secure the lift bracket in the closed position as shown in FIG. 7.

A method of towing a trailer utilizing the weight distributing anti-sway hitch 10 includes the step of inserting the shank 14 into a hitch receiver (not shown) attached to a tow vehicle (not shown) as is conventional. The steps may also include providing weight distributing anti-sway hitch 10 with a head unit 17 having top and bottom plates 20, 21; ball 49 attached to shaft 48, which shaft 48 is disposed within a concentric cylindrical-in-cylinder sub-assembly formed by spindle post 40 and spindle spool 42; and upper and lower trunnion plates 38, 39 disposed between the top and bottom plates 20, 21 and the concentric cylinder-in-cylindrical sub-assembly; wherein the spring arms 34, 35 are removably attached to trunnion spools 66. The method may further include the step of providing a clamp 54 with opposed friction pads 55 disposed about the spindle post 40 and affixed to threaded boss 56 attached to the U-ear hitch plate 18, whereby the rotational movement of spindle post 40 and upper and lower trunnion plates 38, 39 may be adjusted. The method of towing may also include the step of securing a pair of spring arms at one end to respective trunnion spools secured to the head unit and at a second end to the trailer via a respective hookup bracket 36, 37. The step of securing an end of the spring arms 34, 35 to the trailer via a hookup bracket 36, 37 may include providing a hookup bracket 36, 37 having a hookup plate 80 and a hookup strap 82 adapted to engage a trailer 12, wherein the hookup bracket 36, 37 further includes a pair of L-shaped side straps 88 attached to opposite sides of the hookup plate and a lift bracket 100 pivotally attached to a horizontal portion 98 of the L-shaped side straps 88; the lift bracket 100 having a pair of curved fingers 101 that abut against the hookup plate 80 when the lift bracket 100 is in a closed position.

Those skilled in the art will understand that the various components of the embodiments will be made for materials and techniques suited for the proposed use. In particular, the components of the hitch that are subjected to considerable stress during towing of heavy loads, including most of the components elements forming the head unit 17, and spring arms 34, 35 and hookup brackets 36,37 will be made of steel. The wear pads 112 on the hookup brackets 36,37 may be made of nylon or similar material that will resist wear from contact with the spring arms 34, 35 and reduce noise from the metal to metal contact between the spring arms 34, 35 and the hookup brackets 36, 37.

Various alternatives and substitutions to the embodiments disclosed may suggest themselves to those skilled in the art upon reading of the above specification. For example, while trunnion spools 66 and saddles 68a, 68b are disclosed as separate components that are rigidly secured to one another such as by welding, the skilled worker will understand that these may be formed integrally by casting or machining. Such variations and modifications are all considered to be within the scope of the appended claims. Similarly, the illustrations and examples provided herein are for explanatory purposes and are not intended to limit the scope of the appended claims.

We claim:

1. A weight distributing anti-sway trailer hitch comprises: a head unit, a pair of spring arms extending rearwardly from the head unit, and a pair of hookup brackets for connecting a distal end of each spring arm to a trailer;

wherein the head unit comprises a U-ear hitch plate connected to a shank, the U-ear hitch plate including a top plate and a bottom plate extending rearwardly therefrom and a boss affixed to a back side of the U-ear hitch plate, the top and bottom plates in spaced-apart relationship to one another; disposed between the top and bottom plates are an upper trunnion plate, a lower trunnion plate, and a spindle post, the upper and lower trunnion plates operatively connected to the spindle post for rotational movement therewith relative to the top and bottom plates of the U-ear hitch plate; the head unit further comprising a clamp with one or more friction pads, each of the one or more friction pads in engagement with the spindle post and the clamp being affixed to the U-ear hitch plate via the boss, whereby frictional engagement between the one or more friction pads and the spindle post to control rotational movement of the spindle post and upper and lower trunnion plates is adjustable by tightening or loosening the clamp.

2. The hitch of claim 1, wherein the upper and lower trunnion plates define a wing shape, and wherein a center portion of the wing shaped trunnion plates has an aperture for receiving the spindle post therein.

3. The hitch of claim 1, wherein the head unit further comprises a spindle spool, the spindle post and spindle spool each having a cylindrical shape, and wherein the spindle spool is disposed within the spindle post to form a concentric, cylinder-in-cylinder sub-assembly that rotates as a unit relative to the top and bottom plates of the U-ear hitch plate.

4. The hitch of claim 1, wherein the head unit further comprises a pair of trunnion spools adapted to receive a first end of the spring arms, the trunnion spools comprising cylindrical members and defining a transverse notch, the transverse notch aligning with a corresponding transverse notch on the spring arms to create a channel for receiving a retainer pin to secure the spring arm to the respective trunnion spool; wherein one of the trunnion spools is fixed in position relative to the trunnion plates and the other is free to rotate relative to the trunnion plates.

5. The hitch of claim 1, wherein the head unit further comprises a pair of trunnion spools adapted to receive a first end of the spring arms and a pair of saddles secured to each trunnion spool, the saddles defining a convex surface that mates with a circumferential surface of the trunnion spools which comprise cylindrical members; the saddles and trunnion spools being connected to the upper and lower trunnion plates by a respective spindle; wherein one of the trunnion spools is fixed in position relative to the trunnion plates and the other is free to rotate relative to the trunnion plates.

6. The hitch of claim 1, wherein the upper and lower trunnion plates define a wing shape; wherein a center portion of the wing shaped trunnion plates has an aperture for receiving the spindle post therein; wherein the head unit further comprises a pair of trunnion spools adapted to receive a first end of the spring arms and a pair of saddles secured to each trunnion spool, the saddles defining a convex surface that mates with a circumferential surface of the trunnion spools which comprise cylindrical members; the saddles and trunnion spools being connected to the outer portions of the wing shaped trunnion plates by a respective spindle; wherein one of the trunnion spools is fixed in position relative to the trunnion plates and the other is free to rotate relative to the trunnion plates.

7. The hitch of claim 1 wherein the shank comprises a horizontal leg and a vertical leg, the legs disposed at generally a right angle to one another; the U-ear hitch plate having two forward facing, spaced-apart flanges that define a channel for attaching the vertical leg to the U-ear hitch plate.

8. The hitch of claim 1 wherein the shank comprises a horizontal leg and a vertical leg, the legs disposed at generally a right angle to one another; the U-ear hitch plate having two forward facing, spaced-apart flanges that define a channel for attaching the vertical leg to the U-ear hitch plate, wherein the vertical leg has a plurality of spaced-apart apertures that align with apertures in the flanges such that the shank is vertically adjustable relative to the U-ear hitch plate.

9. The hitch of claim 1 wherein the shank comprises a horizontal leg and a vertical leg, the legs disposed at generally a right angle to one another; the U-ear hitch plate having two forward facing, spaced-apart flanges that define a channel for attaching the vertical leg to the U-ear hitch plate, wherein the vertical leg has a plurality of spaced-apart apertures that align with apertures in the flanges such that the shank is vertically adjustable relative to the U-ear hitch plate; and wherein the U-ear hitch plate further comprises an adjustment screw and thumb knob to maintain the proper spacing between the vertical leg of the shank and the U-ear hitch plate.

10. The hitch of claim 1, wherein the hookup brackets comprise a hookup plate and a hookup strap which are adapted to be clamped to a trailer frame by a pair of threaded connectors.

11. The hitch of claim 1, wherein the hookup brackets comprise a hookup plate and a hookup strap which are adapted to be clamped to a trailer frame by a pair of threaded connectors; a pair of L-shaped side straps affixed on opposite sides of the hookup plate, the L-shaped side straps having a vertical portion disposed adjacent to the hookup plate and a horizontal portion that extends away from the hookup plate.

12. The hitch of claim 1, wherein the hookup brackets comprise a hookup plate and a hookup strap which are adapted to be clamped to a trailer frame by a pair of threaded connectors; a pair of L-shaped side straps affixed on opposite sides of the hookup plate, the L-shaped side straps having a vertical portion disposed adjacent to the hookup plate and a horizontal portion that extends away from the hookup plate; the hookup brackets further comprising a lift bracket pivotally connected to the horizontal portion of the L-shaped side straps.

13. The hitch of claim 1, wherein the hookup brackets comprise a hookup plate and a hookup strap which are adapted to be clamped to a trailer frame by a pair of threaded connectors; a pair of L-shaped side straps affixed on opposite sides of the hookup plate, the L-shaped side straps having a vertical portion disposed adjacent to the hookup plate and a horizontal portion that extends away from the hookup plate; the hookup brackets further comprising a lift bracket pivotally connected to the horizontal portion of the L-shaped side straps; the lift bracket having a pair of curved fingers that, when the lift bracket is in a closed position, are adjacent to the hookup plate.

14. The hitch of claim 1, wherein the hookup brackets comprise a hookup plate and a hookup strap which are adapted to be clamped to a trailer frame by a pair of threaded connectors; a pair of L-shaped side straps affixed on opposite sides of the hookup plate, the L-shaped side straps having a vertical portion disposed adjacent to the hookup plate and a horizontal portion that extends away from the hookup plate; the hookup brackets further comprising a lift bracket pivotally connected to the horizontal portion of the L-shaped side straps; the lift bracket having a pair of curved fingers that, when the lift bracket is in a closed position, are adjacent to the hookup plate; the lift bracket further comprising a post to facilitate movement of the lift bracket between open and closed positions.

15. The hitch of claim 1, wherein the hookup brackets comprise a hookup plate and a hookup strap which are adapted to be clamped to a trailer frame by a pair of threaded connectors; a pair of L-shaped side straps affixed on opposite sides of the hookup plate, the L-shaped side straps having a vertical portion disposed adjacent to the hookup plate and a horizontal portion that extends away from the hookup plate; the hookup brackets further comprising a lift bracket pivotally connected to the horizontal portion of the L-shaped side straps; the lift bracket having a pair of curved fingers that, when the lift bracket is in a closed position, are adjacent to the hookup plate; the lift bracket further comprising a post to facilitate movement of the lift bracket between open and closed positions; the lift bracket further comprising a wear pad supported by a spring perch, the wear pad positioned to engage the spring arm.

16. The hitch of claim 1, wherein the head unit further comprises a pair of trunnion spools adapted to receive a first end of the spring arms, wherein one of the trunnion spools is fixed in position relative to the trunnion plates and the other is free to rotate relative to the trunnion plates.

\* \* \* \* \*